US010534404B2

(12) United States Patent
Bhattacharyya

(10) Patent No.: US 10,534,404 B2
(45) Date of Patent: Jan. 14, 2020

(54) WIRELESS NETWORK SYSTEMS AND RELATED METHODS FOR MARINE APPLICATIONS

(71) Applicant: Sampriti Bhattacharyya, San Francisco, CA (US)

(72) Inventor: Sampriti Bhattacharyya, San Francisco, CA (US)

(73) Assignee: Onet Global, Inc., San Francisco, CA (US)

( * ) Notice: Subject to any disclaimer, the term of this patent is extended or adjusted under 35 U.S.C. 154(b) by 0 days.

(21) Appl. No.: 16/272,977

(22) Filed: Feb. 11, 2019

(65) Prior Publication Data

US 2019/0250672 A1     Aug. 15, 2019

Related U.S. Application Data

(60) Provisional application No. 62/628,348, filed on Feb. 9, 2018.

(51) Int. Cl.
| | |
|---|---|
| *G06F 1/16* | (2006.01) |
| *H05K 5/00* | (2006.01) |
| *H05K 7/00* | (2006.01) |
| *H04W 4/38* | (2018.01) |
| *G06F 1/18* | (2006.01) |
| *H04L 29/08* | (2006.01) |
| *B63B 22/00* | (2006.01) |
| *H02S 20/00* | (2014.01) |

(52) U.S. Cl.
CPC ............ *G06F 1/1656* (2013.01); *B63B 22/00* (2013.01); *G06F 1/182* (2013.01); *H02S 20/00* (2013.01); *H04L 67/12* (2013.01); *H04W 4/38* (2018.02); *B63B 2022/006* (2013.01)

(58) Field of Classification Search
CPC ........ G06F 1/1656; G06F 1/181; G06F 1/182; H04W 4/38; B63B 22/00; H02S 20/00; H04L 67/12
USPC ....................................... 361/679.01, 679.02
See application file for complete search history.

(56) References Cited

U.S. PATENT DOCUMENTS

| | | | |
|---|---|---|---|
| 9,397,745 B2 | 7/2016 | Jalali et al. | |
| 9,592,895 B2 | 3/2017 | Yu et al. | |
| 2002/0083880 A1* | 7/2002 | Shelton ................. | B63G 8/001 114/312 |

(Continued)

OTHER PUBLICATIONS

International Search Report, PCT Patent Application No. PCT/US2019/017547, dated Jun. 11, 2019, 4 pages.

*Primary Examiner* — Anthony M Haughton
(74) *Attorney, Agent, or Firm* — Adam R. Stephenson, Ltd.

(57) ABSTRACT

Implementations of communication devices may include: a housing having a hollow compartment in a waterproof shell. The waterproof shell may be configured to float on a surface of water. The communication device may include a computing system having a memory and a processor within the hollow compartment of the housing. The communication device may include an onboard power unit electrically coupled with the computing system. One or more radios may be coupled with the housing and with the onboard power unit and the computing system. The one or more radios may be configured to act as a gateway by receiving data from one or more watercrafts and transmitting the data to one or more receivers over a radio telecommunication channel.

20 Claims, 11 Drawing Sheets

(56) References Cited

U.S. PATENT DOCUMENTS

| | | | |
|---|---|---|---|
| 2006/0223394 A1* | 10/2006 | Porat | B63B 22/24 |
| | | | 441/136 |
| 2009/0303322 A1 | 12/2009 | Harper | |
| 2011/0162573 A1* | 7/2011 | Race | H01Q 1/04 |
| | | | 114/328 |
| 2017/0023676 A1* | 1/2017 | Laster | G01S 15/96 |
| 2017/0233043 A1* | 8/2017 | Thorson | B63B 35/71 |
| | | | 441/135 |
| 2018/0275313 A1* | 9/2018 | Pierik | G01W 1/04 |
| 2019/0135393 A1* | 5/2019 | Pieterkosky | B63G 8/001 |
| 2019/0185122 A1* | 6/2019 | Hamme | G01S 15/74 |

* cited by examiner

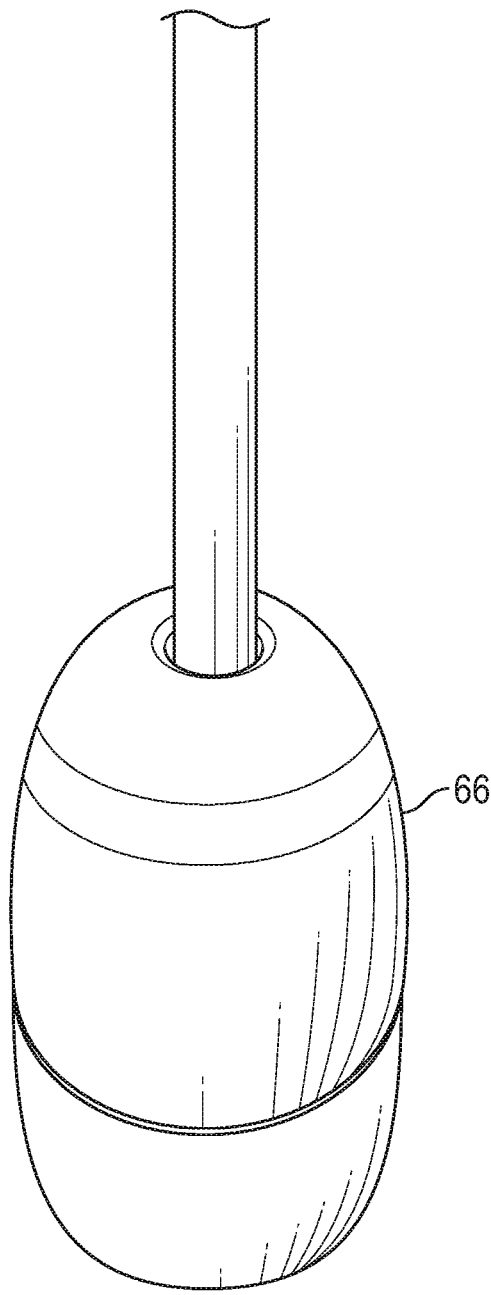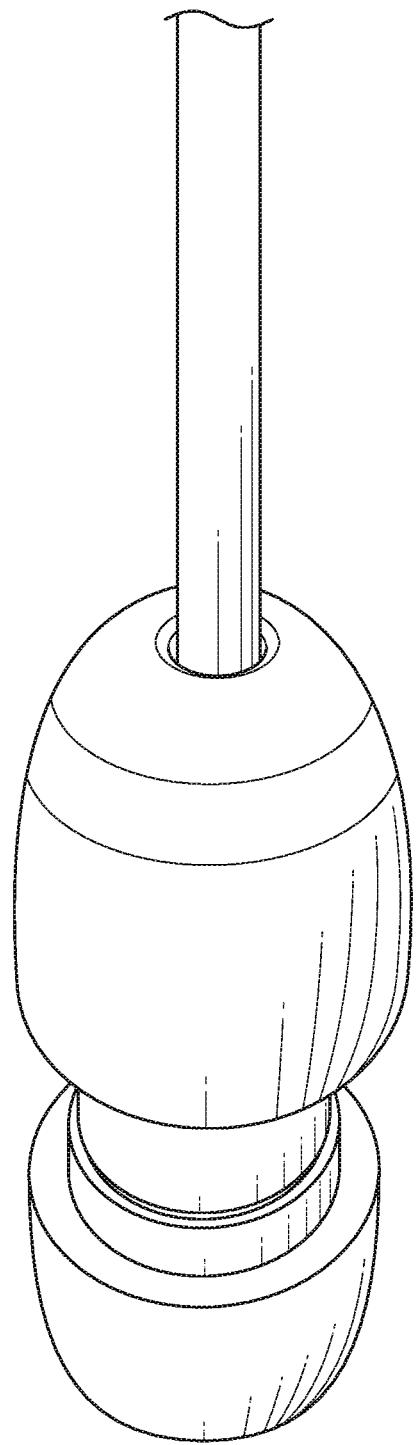
FIG. 11
FIG. 12

WIRELESS NETWORK SYSTEMS AND RELATED METHODS FOR MARINE APPLICATIONS

CROSS REFERENCE TO RELATED APPLICATIONS

This document claims the benefit of the filing date of U.S. Provisional Patent Application 62/628,348, entitled "Wireless Network Systems and Related Methods for Marine Applications" to Sampriti Bhattacharyya which was filed on Feb. 9, 2018, the disclosure of which is hereby incorporated entirely herein by reference.

BACKGROUND

1. Technical Field

Aspects of this document relate generally to communication devices, such as computing devices for data gathering and monitoring. More specific implementations involve communication devices that communicate over telecommunication channels for use in marine applications.

2. Background

It is difficult to monitor marine installations (oil platforms, ships, aquaculture operations, etc.,) because satellite and other wireless forms of communication are far from land-based stations and tend to be low bandwidth and very expensive.

SUMMARY

Implementations of communication devices may include: a housing having a hollow compartment in a waterproof shell. The waterproof shell may be configured to float on a surface of water. The communication device may include a computing system having a memory and a processor within the hollow compartment of the housing. The communication device may include an onboard power unit electrically coupled with the computing system. One or more radios may be coupled with the housing and with the onboard power unit and the computing system. The one or more radios may be configured to act as a gateway by receiving data from one or more watercraft and transmitting the data to one or more receivers over a radio telecommunication channel.

Implementations of communication devices may include one, all, or any of the following:

The communication devices may further include one or more sensors coupled with the housing and configured to communicate with the computing system, wherein the one or more sensors may include one or more of oceanographic sensors, weather sensors, temperature sensors, hydrophones, acoustic sensors, cameras, radio frequency tracking devices, or any combination thereof.

The communication devices may further include a 360-degree camera.

The onboard power unit may include one of a battery, one or more solar cells, a vibrational energy collector, or any combination thereof.

The communication devices may be configured to be anchored to one of a floor of a body of water or to a large structure.

The communication devices may further include a docking and charging station for autonomous water vehicles.

The one or more receivers may include at least one of satellites or land-based towers.

Implementations of a wireless network may include: a master node in a waterproof housing. The master node may include a computing system and a telecommunication system configured to float on a body of water. The computing system may include a memory and a processor. The wireless network may include one or more field nodes. The one or more field nodes may include a housing and a computing system within the housing. The one or more field nodes may also include an onboard power unit electrically coupled with the computing system and one or more sensors coupled with the housing. The one or more sensors may be configured to communicate with the computing system. The one or more field nodes may be configured to float on the water. The one or more field nodes may be positioned around an offshore asset and may be configured to gather data through the one or more sensors. The one or more field nodes may be configured to wirelessly communicate the data with the master node and the master node may be configured to wirelessly communicate the data with other master nodes through high frequency radio.

Implementations of communication devices may include one, all, or any of the following:

The wireless network may further include one or more receivers including at least one of satellites or land-based towers. The master node may be configured to wirelessly communicate the data with the one or more receivers.

The wireless network may further include one or more underwater autonomous vehicles configured to wirelessly communicate the data with one of the master node or the one or more buoys.

The one or more sensors may include one or more oceanographic sensors, weather sensors, temperature sensors, hydrophones, acoustic sensors, cameras, radio frequency tracking devices, or any combination thereof.

One of the master nodes, the one or more buoys, or both the master node and one or more buoys may be anchored to one of a floor of a body of water or to a large structure.

The network further including one or more independent sensors that may be positioned at different heights within a body of water.

Each of the master node and the one or more buoys include a 360 degree camera.

Implementations of a method for monitoring an asset in open water may include: positioning two or more nodes and at least one master node in a body of water surrounding an offshore structure. The method may also include using the two or more nodes, receiving data, through one or more sensors in each of the two or more nodes. Using the two or more nodes, the method may include, processing the data, through onboard computing components in each of the two or more nodes. The method may include sending the data to the master node using a wireless telecommunication channel. The method may include sending the data, using the master node, to one of a satellite or an onshore cellular tower using a wireless telecommunication channel.

Implementations of methods for monitoring an asset in open water may include one, all, or any of the following:

The method may further include recognizing and authenticating incoming watercraft using the at least one master node.

The method may further include receiving and queuing one or more requests from other wireless devices and vehicles in an area around the remote structure, using the master node.

The method may further include detecting threats from unknown systems using the two or more nodes and reporting the threats to a monitoring station coupled with the satellite or onshore cellular tower using the master node.

The method may further include receiving data from sensors included on the offshore structure using the master node, the one or more nodes, or both the master node and the one or more nodes.

The method may further include encrypting the data using the one or more nodes and the at least one master node.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 11 is a side view of another implementation of a node/buoy having an outer shell;

FIG. 12 is a side view of an implementation of a node/buoy having an outer shell with the shell open;

DESCRIPTION

Figure 1:
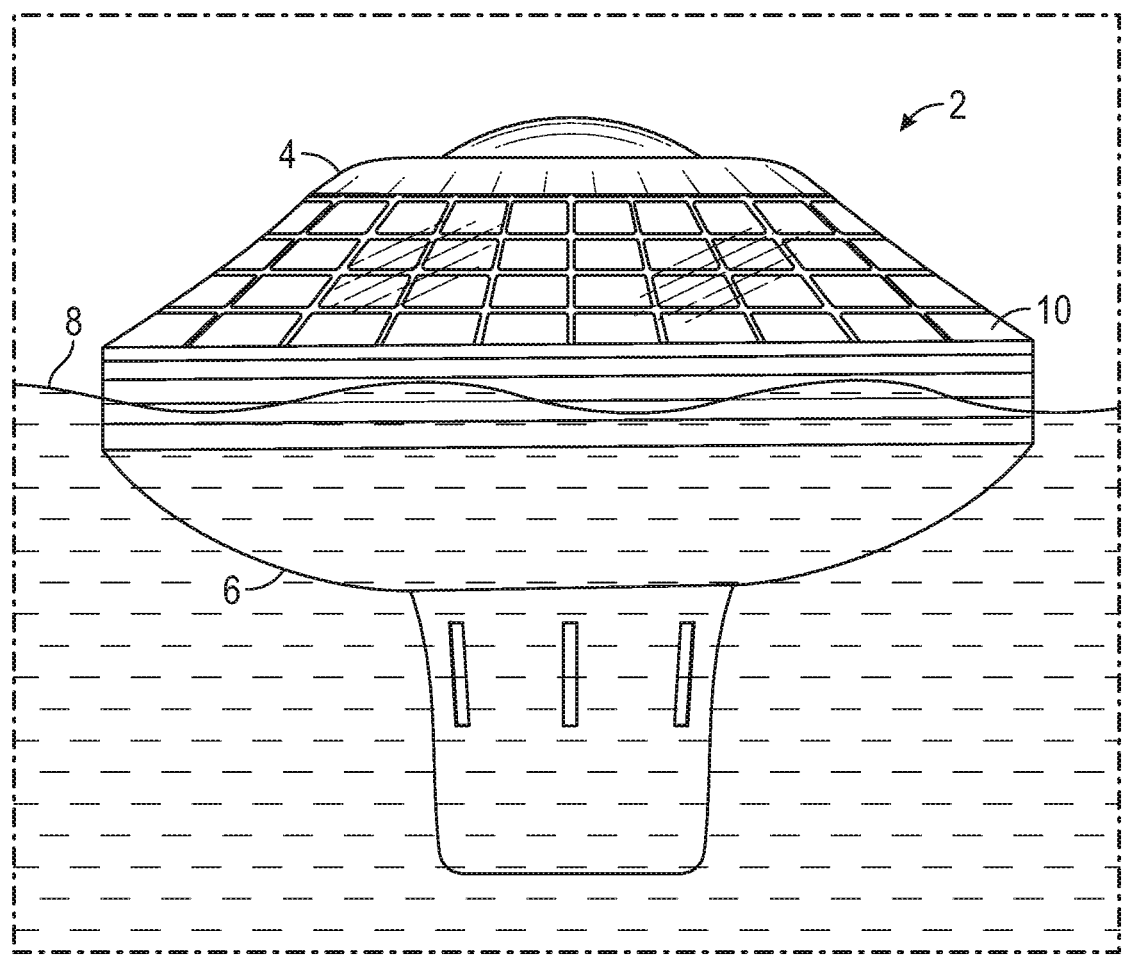
FIG. 1 is a side view of an implementation of a communication device/node.

This disclosure, its aspects and implementations, are not limited to the specific components, assembly procedures or method elements disclosed herein. Many additional components, assembly procedures and/or method elements known in the art consistent with the intended communication devices and wireless networks will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such communication devices and wireless networks, and implementing components and methods, consistent with the intended operation and methods.

As used herein, an asset is defined as anything on the ocean or a marine area that has either economic value or other interest and needs to be monitored or have data collected from. A master node includes a device that acts as a gateway to connect to the internet or the end user. A master node may also be called a Gateway or M node. A master node may have a more robust and powerful computer than a field node. The master node acts as a central server for receiving data from local wireless devices. The master node may handle all data packaging, queuing, routing, and buffering. A field node includes a device with sensors. A field node connects locally to the gateway or master node.

The system and method implementations described herein employ wireless devices that act as nodes in a wireless network to form an intelligent decision making apparatus. The systems may be used for communication and/or surveillance devices, such as wireless gateways, antennas and computing devices integrated with sensors like cameras, environmental monitoring sensors, and sensors for situational awareness and asset health performance. In various implementations, the camera can be submerged in water or be above the water. The camera may be any commercially available camera including but not limited to a 360 degree camera, a wide view camera, or high-resolution camera. In some implementations, the camera can be used for surveillance. The camera may be the sensing unit on the onboard computer. The camera may be used to machine learn algorithms to detect threats underwater or identify and track objects. In various implementations, the objects may include boats, ships, animals or humans. The data collected by the camera can also be used for further training of the system.

Current methods of monitoring marine installations and marine areas using sensor data can be difficult because each sensor may have different communication protocols, custom codes for each sensor, and different sensor brands may have different calibration methods and references. Using local engineering firms may cause complications when monitoring assets in different parts of the world. It may also be difficult to compare data when sensors and assets are located in different countries. Gathering and receiving data can also be difficult because marine assets tend to be far from land-based stations and tend to have low bandwidth. Again operating marine assets in different countries or locations in the world may cause complications when dealing with different telecommunication carriers.

One solution may include creating reliable wireless local area networks (LANs) may be created anywhere in remote locations such as the ocean. These LANs can have a central station or gateway that can be used to uplink with the internet of the Main Gateway. These gateways can also act as a long-range access point. The central station may include computing and decision making abilities using a master node as defined above. The central station may use an algorithm to compress and package the data, handle buffering, queuing, handshaking, and optimal routing to the internet via satellite or cellular communication. The central station may also communicate with another central station. The central station may also communicate with field nodes when sending and recovering data. The wireless network may also include communication through high frequency (HF) radio (3-30 MHz), very HF radio (VHF, 30 MHz-300 MHz), and Ultra HF radio (UHF, 300+ MHz).

The overall network architecture can be broadly divided into three layers. The first layer may include the master nodes creating a wireless local area network. This network may be limited to line of sight and use a hybrid communication technique including a combination of traditional WIFI (e.g. 900 MHz 2.4 GHz, 3.6 GHz, 4.9 GHz, 5 GHz, 5.9 GHz and 60 GHz), BLUETOOTH, LORAWAN, and any other allowed frequencies to transmit data includes LF (less than 30 MHz) to HF to VHF or UHF. The computing device on the master nodes and field nodes may be used to decide which communication method to use depending on range or distance to destination, priority of the data, type of data, power availability on the node, and/or amount of date/The computing device may also be programmed to use a specific method as instructed and a specific power limit to avoid interference with adjacent independent user. A dashboard may be used to control the specific configuration of the device.

The second layer of the network architecture may include a Wide Area Network. In this layer, the Main Gateway (or M node) may gather data from the field nodes and then handles buffering, queuing, and routing of data packets to the next point to get to the end use. The next point may include a satellite, a cellular tower, or another M node. The M node may turn any asset to a node in a decentralized adhoc network on the oceans. When two M Nodes are in the vicinity of each other, a data channel may be established with exchange/validation of keys that establish the permission policy. When many M nodes interconnect a global wireless network is created which no longer limited to line of sight.

The third layer of the network use HF and Non-line of Sight Method. In various implementations, this may include using skywave communications where the signal is bounced back and off from the ionosphere. This may be used as a low bandwidth to ensure connectivity or ability to send the most critical information under any conditions. The computing systems on the master nodes may decide the usage of each layer of the network. The main gateway/master node, the field nodes, and/or the integrated sensor/sensor modules, when turned on, can wirelessly communicate and instantly send the data on a local dashboard and to the internet as defined by priority. Sensor deployment on an ocean asset may be reduced to matter of hours instead of months. In various implementations, the nodes may also be used to connect with existing wireless channel for backhaul to the end user.

The wireless mesh network may include a master node enclosed in a waterproof housing. The network/system may also include one or more field nodes (which may be buoys in various implementations) containing nodes in a waterproof housing. Each node may have onboard computing that can work in any aquatic environment and create a local wireless network for optimally exchanging data of variable bandwidth with other systems. The computing system in each node may include a processor and a memory. The master node may also include a telecommunication system capable of sending data to various receivers including satellites and onshore cellular towers. The master node may have a more powerful transceiver than the field nodes and may acts the gateway to the cloud or final destination. When deployed directly on the water, the master node can be held in place with a portion of the device above water. The devices can communicate to each other or with any other asset which using the same protocol. The nodes, both the master node and the field node, in the mesh network may also include an onboard power unit electrically coupled with the computing system. The master nodes and the field nodes may be configured to float on a surface of water. The various nodes can connect with other nodes to establish a wireless mesh network in marine areas or remote locations in the ocean.

In various implementations, the system may be augmented with environmental monitoring sensors including surveillance system and docking and charging ability for marine vehicles (surface and/or submersible). Many offshore and coastal infrastructures need massive amount of data for effective monitoring of the structural health, operational efficiency, to predict threats and risks and to respond to onsite emergencies or natural disaster. The communication devices described herein may provide a cost effective ways of collecting, sending, processing, and implementing changes using the collected data to protect expensive assets and provide effective management. In addition, these communication devices and systems may be capable of gathering data and providing protection in next generation asymmetric warfare that may threaten border security by providing a thorough surveillance of incoming marine vehicles for the detection of foreign agents, illegal immigrants, contraband, chemical, or biological weapons. Various system and method implementations may be used to sense threats using sensors and onboard intelligence to process the data to detect and respond to threats.

The sensors may be standardized to ensure secure data communication to the main gateway. The standardization of the sensors may be used for underwater sensors and floating sensors. To standardize the sensors without need to write custom code for every device a manual custom hard wiring adapter may be used. The adapter board is used to insulate the main processor from a particular sensor provider. The adapter may be a microcontroller board which deals with protocols specific to each sensor. This allows communication to the next layer to be identical for all sensors. This also simplifies switching sensor providers because new connections and firmware are isolated to the adapter board making everything downline unchanged. Sensors may be integrated with the adapter board and used as a single module or third party commodity sensors can also be used with the adapter boards.

In various implementations of the system, encryption may be performed at the adapter. Encryption is ensured because the sensor to adapter connection is hard-wired and potted. Neither the connection not the adapter can be accessed except by destroying the adapter. The encrypted system could not be used even if a unit is stolen. The connection between the adapter and the buoy and/or main processor are also wired connections having a connector between the devices. The connector allows non-destructive access that requires physical access to the device. Encryption in the adapter keeps outsiders from tapping into the sensors' data or allowing the ability to take the sensor and use it. By non-limiting example, when the sensor uses encryption, the field node would need to decrypt so the slave would need to have the decryption key. The slave could send the master node the sensor ID and receive a decryption key. The decryption key could change or be changed on a regular basis to limit access to the network. In various implementations, the decryption key can be changed automatically on a set schedule such as days or hours. The decryption key can also be changed manually be a user when necessary. In some implementations, the decryption key can be stored on a central server. In various implementations, compression of data can be done at the adapter. The adapter board may be used to standardize and normalize the sensor data.

Referring to FIG. 1, an implementation of a communication device 2 is illustrated. This may be the design of a master node (main gateway) or a field node. The communication device includes a housing 4. The housing may be water tight and may be positioned on a dry asset like a ship, or boat, or a rig, or directly deployed in the water, The housing includes a hollow compartment in a waterproof shell 6. The waterproof shell is designed to float on a surface of water 8. This particular shape allows stability of the node when floating on the surface of the water. The device can be anchored at the bottom with a tether so that only some of the device is visible above water. The shape can vary and include stealth designs which include designs that look like other marine equipment. The communication device 2 includes a computing system including a memory and a processor within the hollow compartment of the housing 4. The device also includes an onboard power unit electrically coupled with the computing system. The onboard power unit may include a battery within the housing, one or more solar cells 10, a vibrational energy collector, or any other self-contained or wireless power mechanisms. The communication device may also include one or more radios coupled with the housing and with the onboard power unit and the computing system. The radios are configured to act as a gateway by receiving data from one or more watercrafts. The watercrafts may travel below or on the surface of the water.

In various implementations, the communication device may include one or more sensors. The one or more sensors may be coupled to the outside of the housing of the communication device. In other implementations, the one or more sensors may coupled to the inside of the housing. In some implementations, the one or more sensors may be configured to communicate with the computing system in the communication device. In various implementations, the sensors may include one or more of oceanographic sensors, weather sensors, temperature sensors, hydrophones, acoustic sensors, cameras, radio frequency tracking devices, or other environmental sensors. In some implementations, the communication device may include one or more of each of the described sensors or any combination of the sensors. In still other implementations, the communication device may include a 360-degree camera.

A method of monitoring an asset in open water may include positioning two or more nodes and at least one master node in a body of water. In various implementations, the nodes may surround an offshore structure. In other implementations, the nodes may be placed strategically in open water with no particular structure or asset being monitored. The two or more nodes may be used to receive data through sensors in each of the nodes. Each node may have at least one sensor and in various implementations, each nodes will have multiple sensors with different capabilities. The two or more nodes may be used to process the data using the onboard computing components in each of the nodes. The two or more nodes may send the data to the master node using a wireless telecommunication channel. The master node may then send the data to a satellite or an onshore cellular tower using a wireless telecommunication channel. In various implementations, the method of monitoring an asset or territory of water may include recognizing and authenticating incoming water craft using at least one master node. In other implementations, the method may include receiving and queuing requests one or more requests from other wireless devices and vehicles in an area around a remote structure using the master node.

Implementations of nodes may be utilized in various system implementations to carry out monitoring using various monitoring method implementations. In implementations where a marine asset is being monitored, (referring to FIGS. 2 and 3), the method may include using all or partial information of any of the following, by non-limiting example: the type of asset, the area covered by the asset, the monitoring area of interest (or the area of interest for collecting data from/sending data to), the priority areas of monitoring/surveillance, the type of sensors, the number of sensors, the structure of the system (constraints where systems can or cannot be installed, for example, or where there is signal barriers), or any other user desired variable.

The method may employ an algorithm to optimally decide on the number of nodes and the position of the nodes to attain the inspection and monitoring requirements. In particular implementations, the algorithm determines the number and position of the nodes by optimizing a cost function which includes those variables which the system user determines are of priority and sets in a determined priority order. By non-limiting example, a list of factors that may be prioritized by the user may include one, all, or any combination of the following: dollar cost of installation and use of this system during the lifecycle, priority areas having best coverage for data and for the necessary bandwidth, avoiding blind spots, ensuring network robustness and redundancy (for example, ensuring 6 sigma reliability for to ensure extreme mission critical data can always reach the end user), cost of false detects and failure, cost of missing detections, overall global operation costs, and level of security needed.

Figure 2:
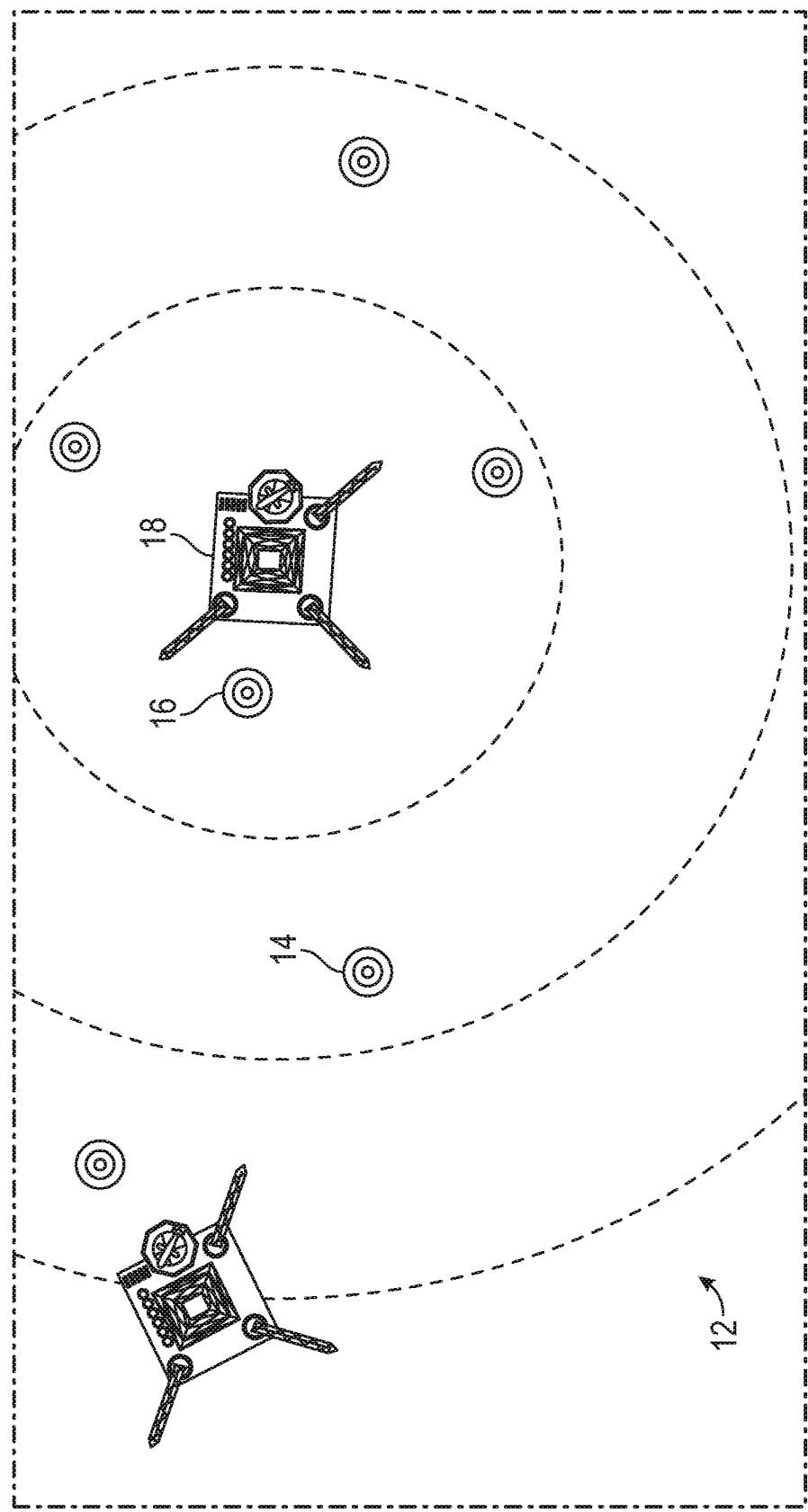
FIG. 2 is a top view of an implementation of a wireless mesh network.
Figure 3:
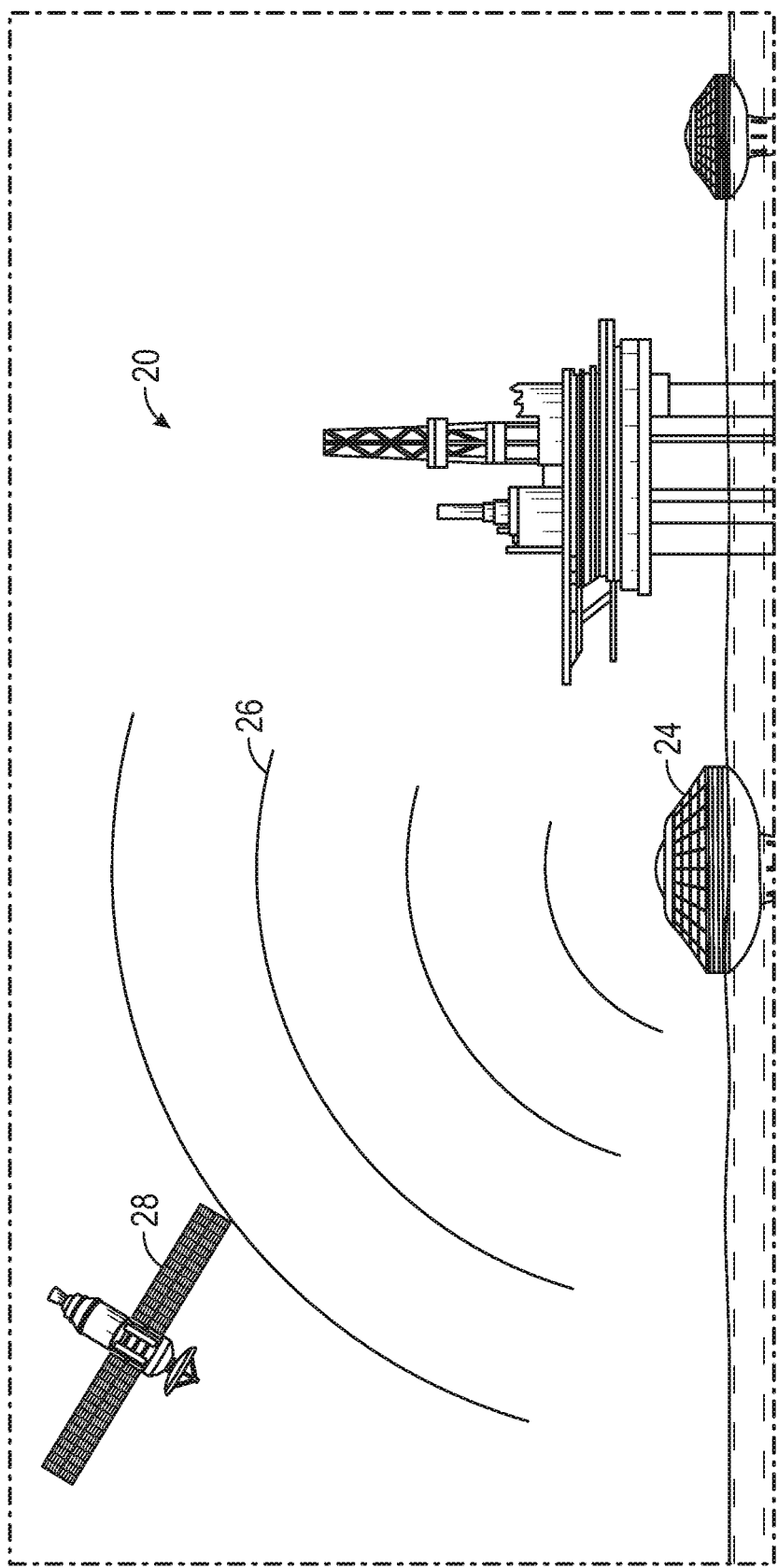
FIG. 3 is a side view of an implementation of a communication device sending data to a satellite.

Referring to FIGS. 2 and 3, the system and method implementations are used to create a secure wireless network (secure wireless mesh network) as illustrated. The wireless mesh network 12 includes a master node 14. In various implementations of a wireless mesh network more than one master node may be included. The master node may include a computing system and a telecommunication system packaged within a waterproof housing. The computing system includes a processor and a memory. In various implementations, the master node is configured to float on a body of water and may be anchored to a floor of the body or water. In other implementations, the master node 16 may be anchored to a large structure 18. The positioning of the node around an oil rig and other large structure may be determined using an algorithm. Referring to FIG. 3, a side view of an implementation of a wireless mesh network 20 is illustrated. The master node 24 is illustrated sending data 26 to a satellite 28.

In various implementations, any authorized device from the surrounding can connect to this wireless network, transfer data to the nodes, or exchange information. For every "M" number of nodes, a "master node" is assigned that meets the mission requirement (in terms of robustness, criticality, reliability). Nodes may process data into either compact raw data, or interpreted/processed data and then send the packaged in-formation to a 'master' node. The master node then relays the information to the end user through a long distance 'transceiver'—which may be a satellite if this system is offshore, or a cellular network tower if the system is more in the coastal region. In addition, in various implementations, the master nodes from each cluster, can further transfer the data to a super master which acts as the main transfer point of the packaged data. The identity of the node acting as "master" or "super master" can be dynamic in nature, which means the nodes may query for the master transceiver location and send the data to the node determined to have the best line of sight with the satellite/tower which will act as the master node.

Figure 4:
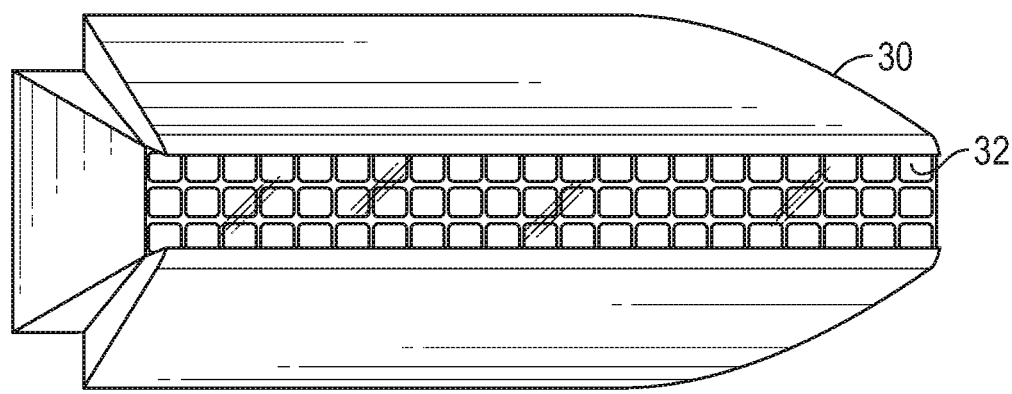
FIG. 4 is a side view of an implementation of an autonomous water vehicle.
Figure 5:
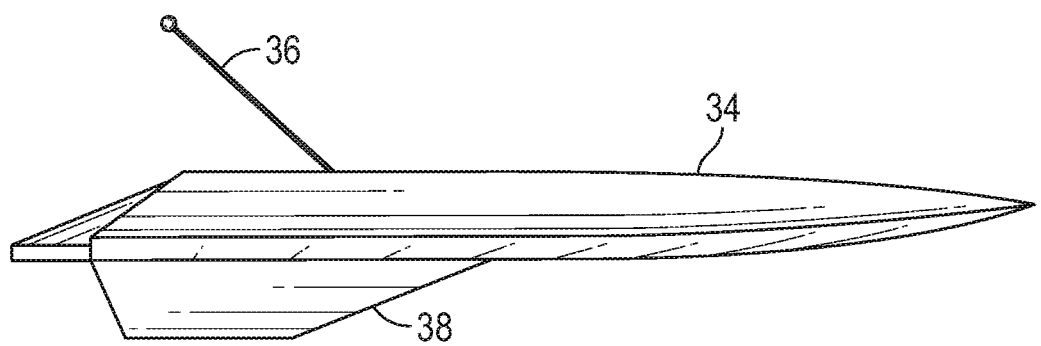
FIG. 5 is a side view of an implementation of another autonomous water vehicle.

The nodes may be employed in conjunction with many different vehicle types once the wireless network has been set up and configured. Since these nodes 14, 16, 24 are relatively fixed in position after being arranged using the method, they may be referred to as static nodes. Other nodes may be mounted on the various vehicles themselves in various implementations. Referring to FIGS. 4 and 5, implementations of autonomous water vehicles are illustrated. In various implementations, a master node may be mounted on these vehicles to provide a mobile node. Referring to FIG. 4, the vehicle 30 includes solar panels 32 to power the vehicle. Referring to FIG. 5, the vehicle 34 includes an antenna 36 for wireless connectivity. The vehicle 34 may be able to communicate with the wireless mesh networks. The vehicle 34 also includes a dock and charging station 38.

Figure 6:
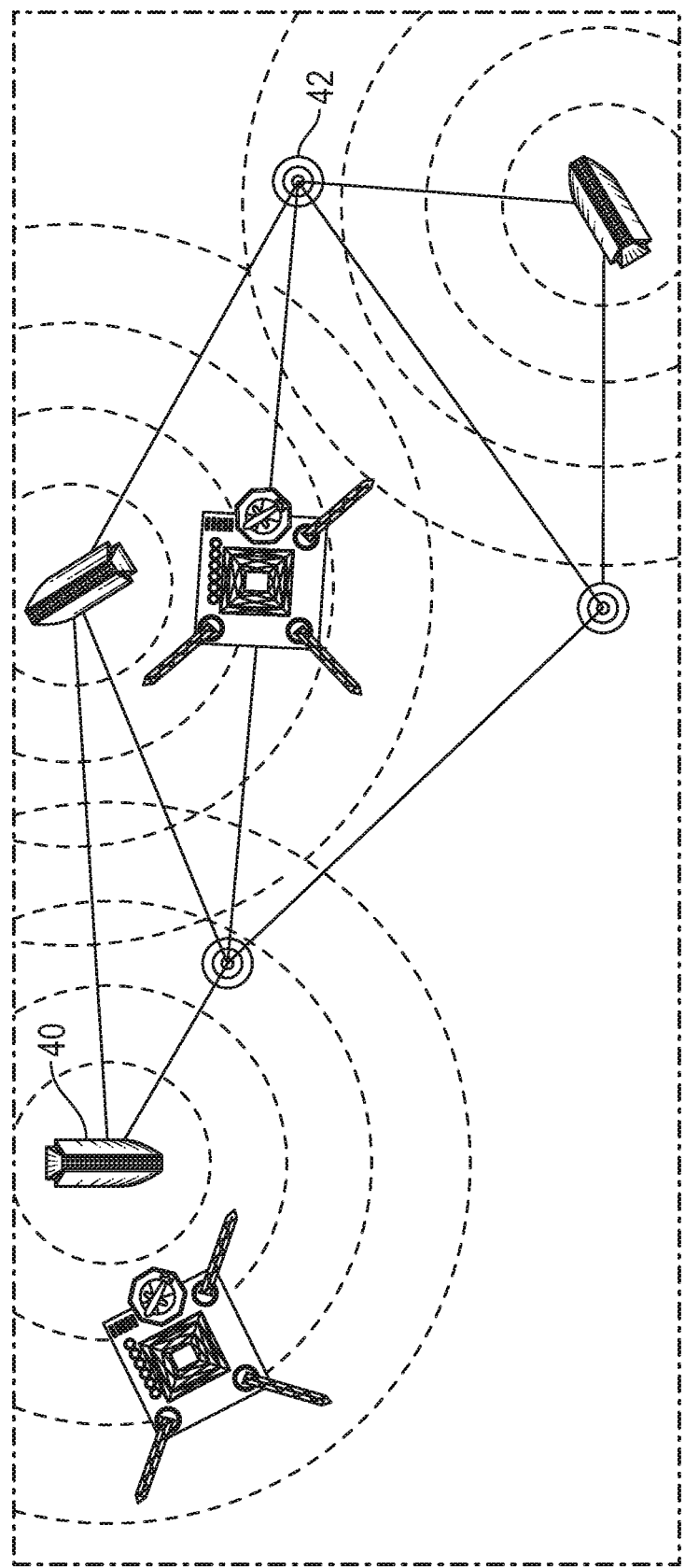
FIG. 6 is a top view of another implementation of a wireless mesh network.

Referring to FIG. 6, where a combination of vehicle mounted nodes (mobile nodes) 40 are employed, the static nodes 42 act to provide wireless network for the mobile nodes which, if needed, can also create local wireless hotspots around each of the mobile nodes. As mentioned before, the mobile nodes 40 are also authenticated with the static nodes 42 of the network using the various security protocols used by the static nodes.

Figure 7:
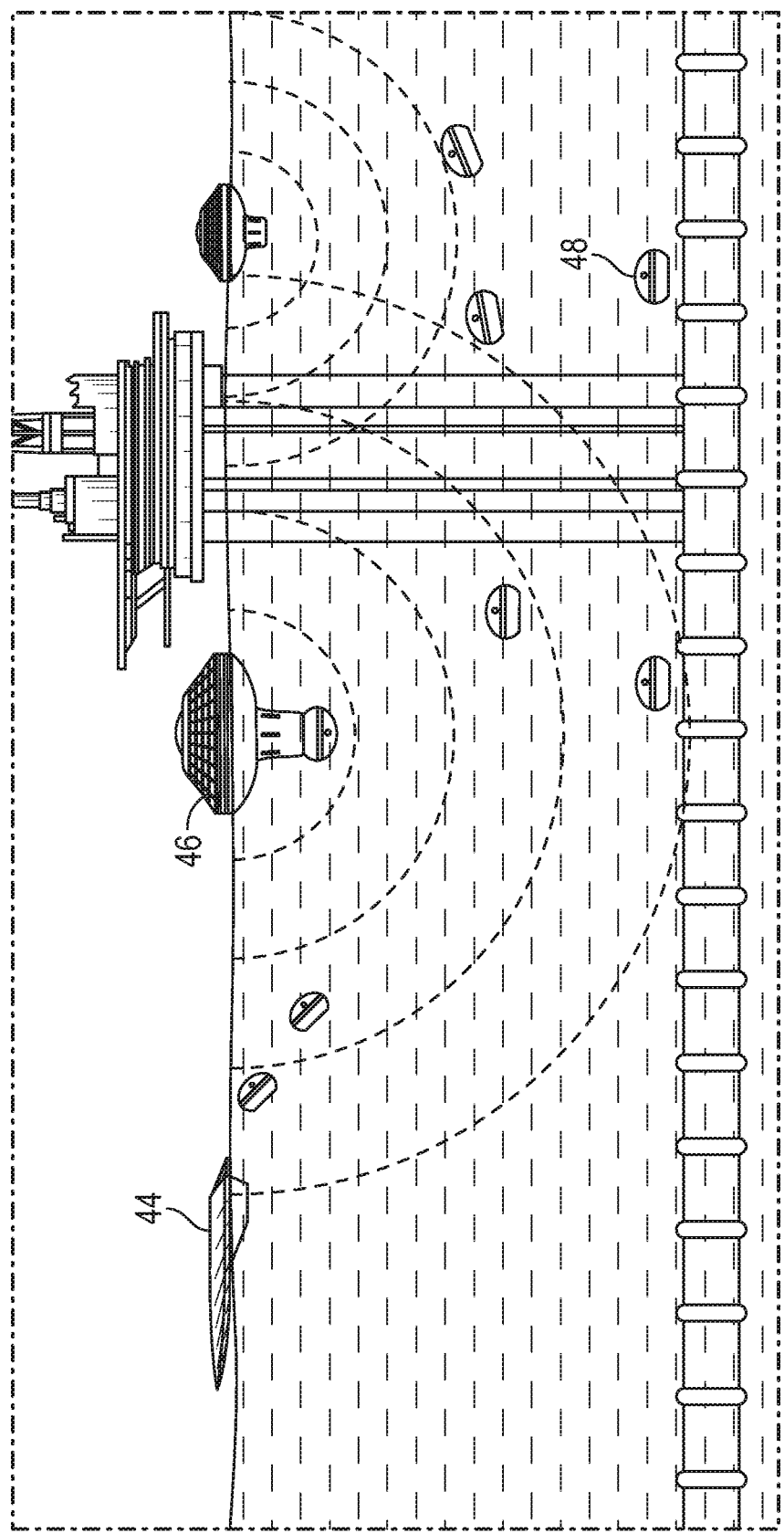
FIG. 7 is a side view of another implementation of a wireless mesh network.
Figure 8:
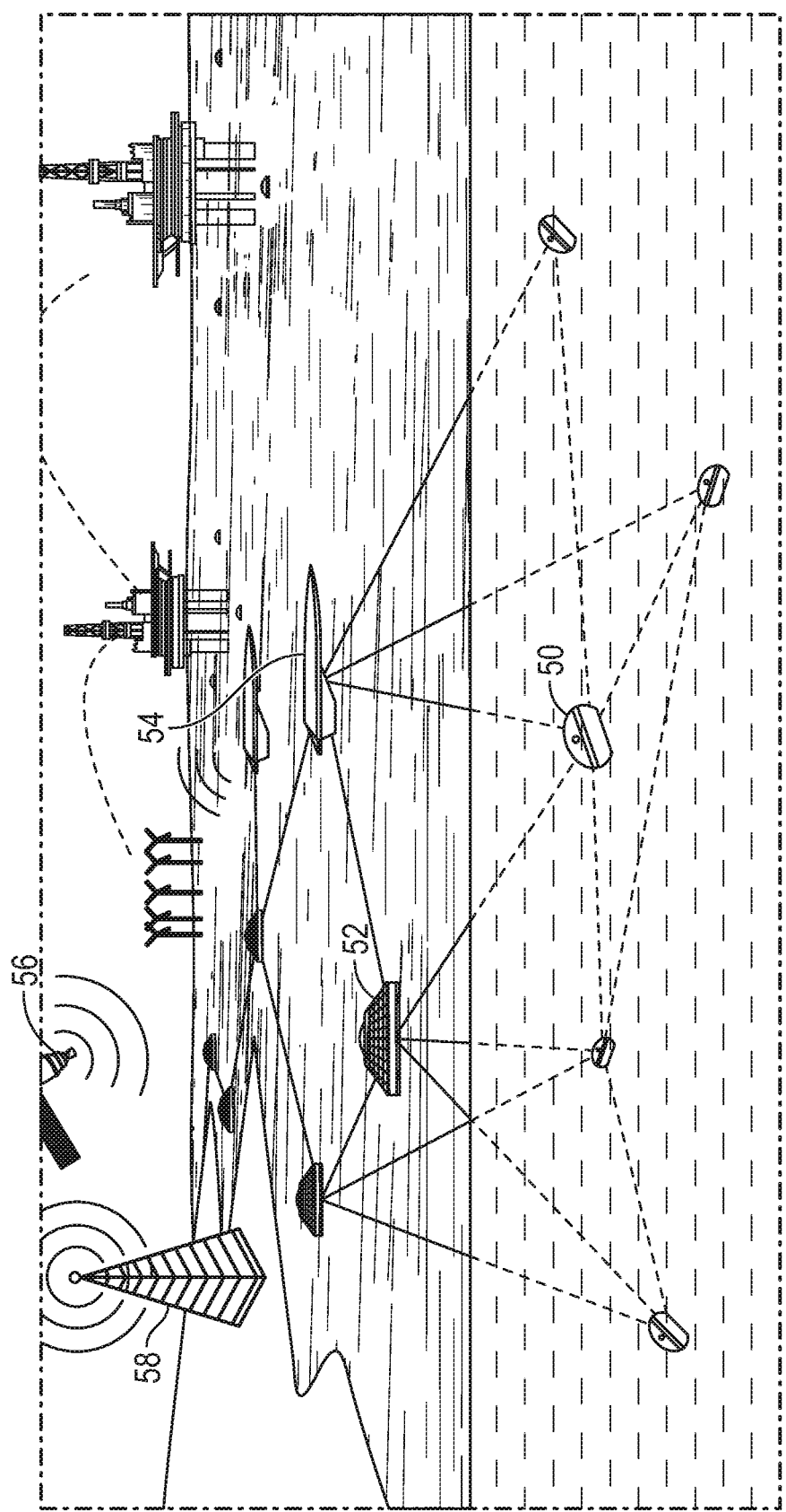
FIG. 8 is a side view of another implementation of wireless mesh network.

As illustrated in FIG. 7, the mobile nodes 44 and/or the static nodes 46 and 48 act as localization aids for underwater and overwater structures for absolute geopositioning as well as acting as charging and docking stations for the underwater vehicles. Where docking and charging are carried out, security authentication of the submersible vehicles is used before the vehicle is docked and/or charged. Localization of the submersibles may be done by using either triangulation method from any 3 nodes, and/or in conjunction with, time of flight methods. In particular implementations, for precise localization, the same unit may be localized by multiple nodes (moving or static) and a weighted average estimation of the position of the underwater vehicle may then be obtained. FIG. 8 illustrates the multilayer (surface and underwater) system where submersibles 50 are in communication with surface nodes 52 and vehicles 54 which are in turn in communication with satellites 56 or land-based towers 58.

In defense applications, each node may include components used for tracking and/or taking action against intruders. As discussed previously, the node system with onboard intelligence can track and identify objects and authenticate objects. Tracking may include a 360 degree camera/vision system which may be coupled with other methods of imaging, such as, by non-limiting example, acoustics. These nodes may be used for border security in ports, for detecting illegal ships, contraband, narcotics trade submersibles, underwater threats, stealth weaponized systems designed for attack.

Figure 9:
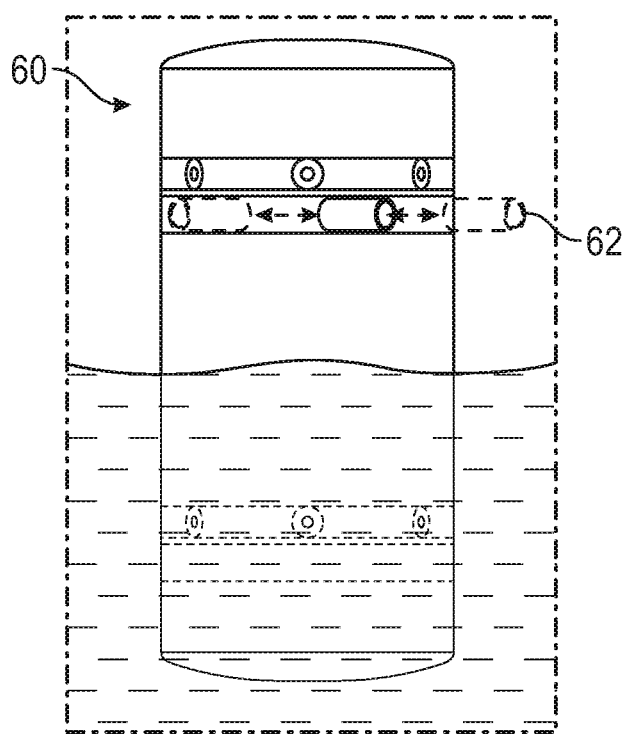
FIG. 9 is a side view of an implementation of a node/buoy.
Figure 10:
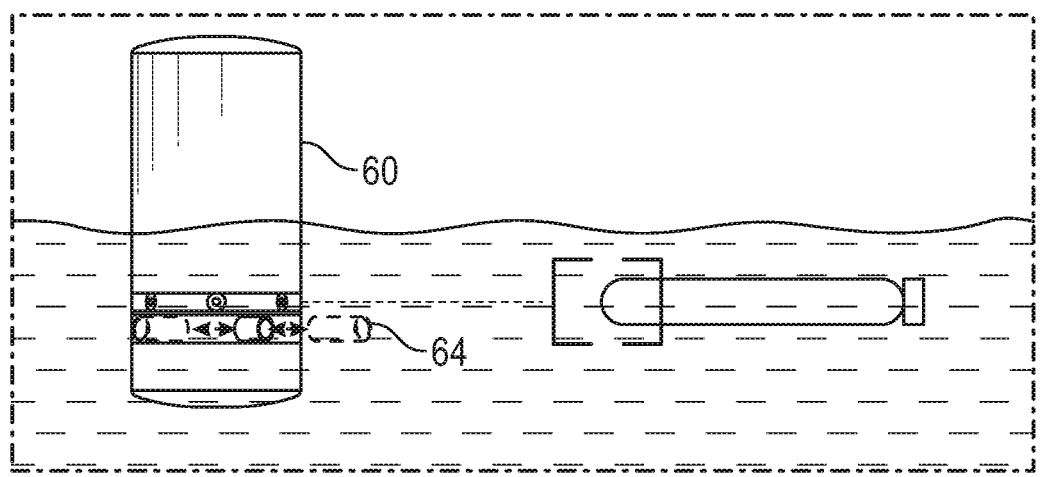
FIG. 10 is a side view of implementation of a node/buoy identifying a threat.

If the node identifies an object that fails the authentication test, the node is able to initiate action either by commands sent to it from a command station, or using its onboard intelligence. Referring to FIG. 9, the node 60 tracks the threat target and points a barrel/weapon port 62 at the threat target. The barrel/weapon port 62 may use various ways to impair the threat, including, by non-limiting example, firing projectiles, markers, light, and any other energy or device designed to impair or destroy the threat. For example, after determining a target, a projectile propulsion mechanism in the node can reorient to aim at the target threat. Particular node implementations may be capable of housing high density explosives (HDE) for protection of vulnerable coastal borders if needed. FIG. 10 illustrates how the node 60 may also be configured to take action underwater using a port 64 in similar ways as the node of FIG. 9 takes action above water.

For applications involving offshore structures (energy rigs, wind farms, aquaculture pens, wave energy generating stations, etc.), the same principles disclosed in this document may be employed to establish the network of nodes, collect the needed data, and forward it for processing and decision making. First, the positioning method is used for optimal physical placement of the smart nodes around the offshore structure for cost-efficient coverage optimization. As previously discussed, the method employs an algorithm like a cost function to be minimized that used, by non-limiting example, the number of sensors, the bandwidth of data and priority of the data, area of coverage needed, and other user specified constraints to determine the physical location of the smart nodes around the offshore structure. As previously discussed, each node may include a hybrid wireless communication system which enables (1) collection and transmission of data from sensors connected directly to the module to other nodes or central station, (2) collection/reception of data from other wireless sensors situated on the offshore structure or other vehicles or platforms, or other nodes and/or (3) reception of data from other station/nodes. Each node also include an onboard power unit (battery, solar cells, vibrational energy collector, etc.) and an onboard computer that processes and encrypts the data onboard, and compresses it in various implementations for sending to a central node/station.

Figure 13:
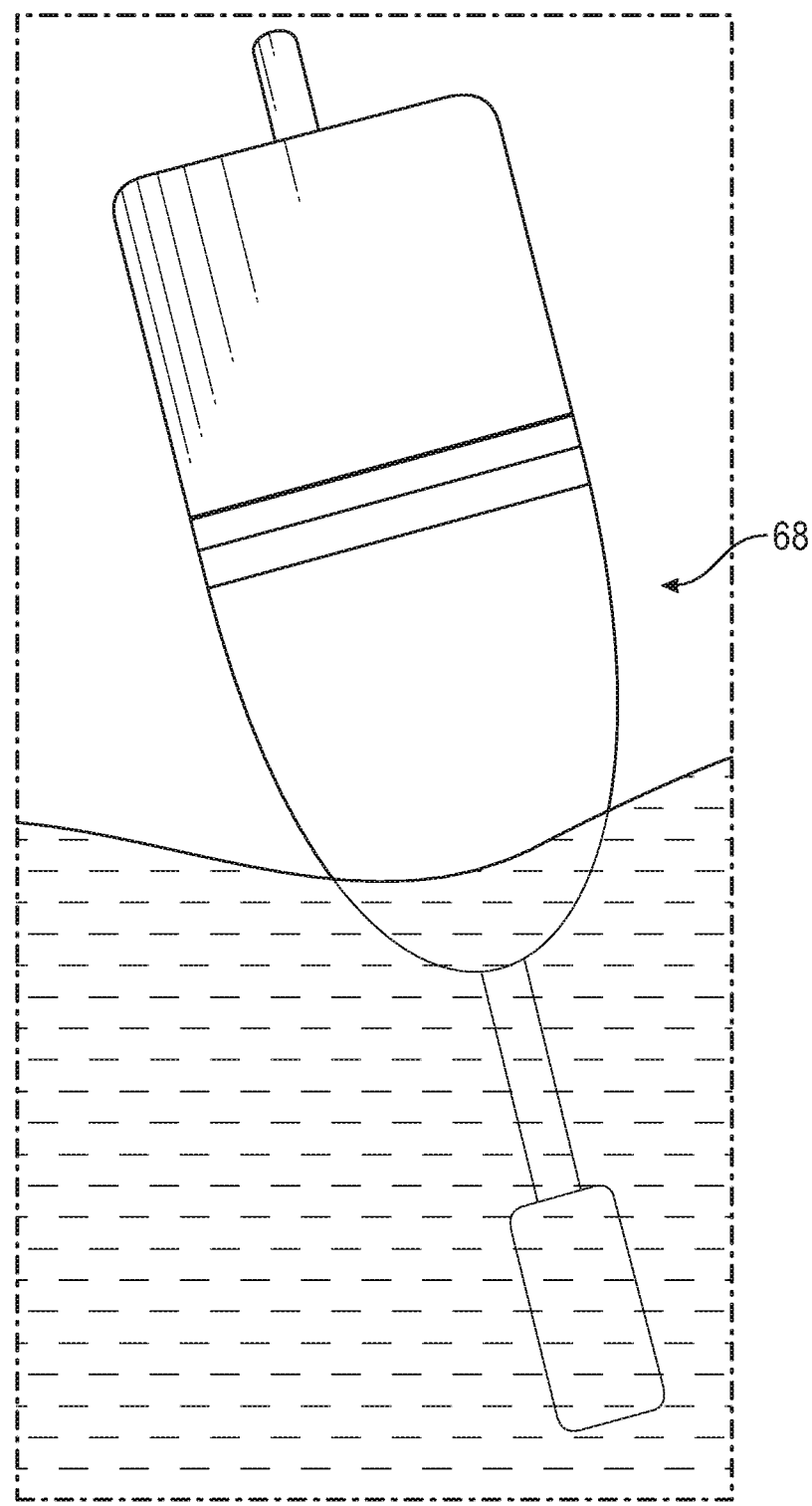
FIG. 13 is a side view of an implementation of a node/buoy in a body of water.

Referring to FIGS. 11 and 12, an implementation of a node housed inside a buoy 66 is illustrated. In a particular implementation, the node may be housed inside of/be part of a buoy. This can be a foam buoy with an internal hollow compartment that houses the smart node module. Referring to FIG. 13, another example of a buoy 68 is illustrated. The buoy can include an onboard battery, a solar panel on the top of the structure, and may have a wave energy harvesting unit in some implementations. The buoy 68 is anchored at the bottom or to a bottom structure. The buoy may be robust against collision due to absence of external protrusions and appendages. In various implementations, the buoys may include one or more antennas for increased connectivity. The buoy may serve as a docking and charging station for autonomous underwater vehicles (AUVs). The buoy may also provide wireless charging ability for other devices. The buoy may, in particular implementations, provide sonar/RF pinging to the underwater AUVs for localization purposes for the AUVs. Since the nodes have known GPS locations, pinging the AUVs may enable precise localization of the AUVs underwater.

Figure 14:
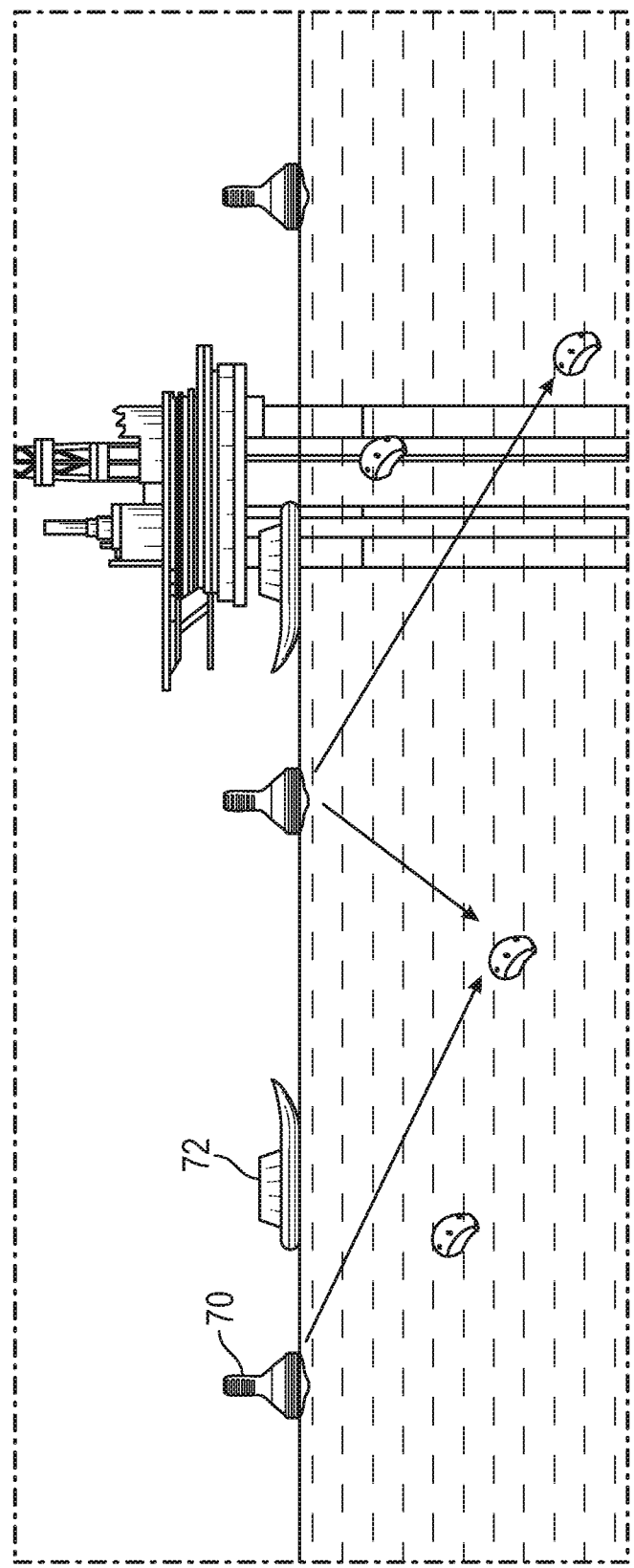
FIG. 14 is a side view of another implementation wireless mesh network.

Referring to FIG. 14, the communication process between the buoys 70 and the various AUVs 72 is illustrated. The buoys may include RF trackers/RF ID tags (active or passive). When nearing decommissioning, the RF trackers on the buoy may enable collection of any buoy to avoid ocean pollution or debris at the ocean bottom. To send the packaged data to the main station, the buoys "search" for a satellite or cellular network. The sending can be done optimally by sending all the packages to a dynamic master node (whichever picks up the signal) which in turns uploads the package to the satellite or the traditional wireless network (cell tower, etc.). A buoy-based network (mesh network) may be formed by positioning the buoys and transmitting the data among the buoys using the principles disclosed herein around an offshore oil rig.

The various system and method implementations collect data, which is transmitted and stored in computing systems (servers, databases, web servers, etc.) that are designed to allow a system user to retrieve, view, process, and act on the data. Various dashboard computer interfaces may be generated by the computing systems using the data. Thresholds for particular operating parameters may be established by measuring ideal references against which measured values are compared. In various implementations, the dashboard interface may suggest actions to the user to take to correct deviations of values from the nominal thresholds. Statistical control charts, graphs, data tables, pie charts, cluster charts, and any of a wide variety of data display and/or analysis tools may be included in various dashboard computer interface implementations. Furthermore, various alerts/alarms may be displayed in response to variables passing certain thresholds, and various actions to take to correct the alerts/alarms may be suggested to the user in various interface implementations. A wide variety of computer interface implementations may be constructed using the principles disclosed herein. Any of the various implementations disclosed in document filed herewith as Appendix A may be used, the disclosure of which his hereby incorporated entirely herein by reference.

In places where the description above refers to particular implementations of communication devices and wireless mesh networks and implementing components, sub-components, methods and sub-methods, it should be readily apparent that a number of modifications may be made without departing from the spirit thereof and that these implementations, implementing components, sub-components, methods and sub-methods may be applied to other communication devices and wireless mesh networks.

What is claimed is:

1. A communication device comprising:
   a housing comprising a hollow compartment in a waterproof shell, the waterproof shell configured to float on a surface of water;
   a computing system comprising a memory and a processor comprised within the hollow compartment of the housing;
   an onboard power unit electrically coupled with the computing system; and
   one or more radios coupled with the housing and with the onboard power unit and the computing system;
   wherein the one or more radios are configured to act as a gateway by receiving data from one or more watercrafts (above or below water) and transmit the data to one or more receivers over a radio telecommunication channel.

2. The communication device of claim 1, further comprising one or more sensors coupled with the housing and configured to communicate with the computing system, wherein the one or more sensors comprise at least of one or more of oceanographic sensors, weather sensors, temperature sensors, hydrophones, acoustic sensors, cameras, radio frequency tracking devices, or any combination thereof.

3. The communication device of claim 1, further comprising a 360-degree camera.

4. The communication device of claim 1, wherein the onboard power unit comprises one of a battery, one or more solar cells, a vibrational energy collector, or a combination thereof.

5. The communication device of claim 1, wherein the communication device is configured to be anchored to one of a floor of a body of water or to a large structure.

6. The communication device of claim 1, the device further comprises a docking and charging station for autonomous water vehicles.

7. The communication device of claim 1, wherein the one or more receivers comprise at least one of satellites or land-based towers.

8. A wireless mesh network, comprising:
   a master node comprised in a waterproof housing comprising a computing system and a telecommunication system configured to float on a body of water, the computing system comprising a memory and a processor;
   one or more field nodes, the one or more field nodes comprising:
   a housing;
   a computing system comprised within the housing;
   an onboard power unit electrically coupled with the computing system; and
   one or more sensors coupled with the housing and configured to communicate with the computing system;
   wherein the one or more field nodes are configured to float on the water; and
   wherein the one or more field nodes are positioned around an offshore asset;
   wherein the one or more field nodes are configured to gather data through the one or more sensors; and
   wherein the one or more field nodes are configured to wirelessly communicate the data with the master node and the master node is configured to wirelessly communicate with other master nodes through high frequency radio.

9. The network of claim 8, further comprising:
   one or more receivers comprising at least one of satellites or land-based towers;
   wherein the master node is configured to wirelessly communicate the data with the one or more receivers.

10. The network of claim 8, further comprising one or more water autonomous vehicles configured to wirelessly communicate the data with one of the master node or the one or more buoys.

11. The network of claim 8, wherein the one or more sensors comprise at least one of one or more of oceanographic sensors, weather sensors, temperature sensors, hydrophones, acoustic sensors, cameras, radio frequency tracking devices, or any combination thereof.

12. The network of claim 8, wherein one of the master nodes, the one or more buoys, or both the master node and one or more buoys are anchored to one of a floor of a body of water or to a large structure.

13. The network of claim 8, further comprising one or more independent sensors positioned at different heights within a body of water.

14. The network of claim 8, wherein each of the master node and the one or more buoys comprises a 360 degree camera.

15. A method for monitoring an asset in open water, the method comprising:
   positioning two or more nodes and at least one master node in a body of water surrounding an offshore structure;
   using the two or more nodes, receiving data, through one or more sensors comprised in each of the two or more nodes;
   using the two or more nodes, processing the data, through onboard computing components in each of the two or more nodes;
   sending the data to the master node using a wireless telecommunication channel; and
   sending the data, using the master node, to one of a satellite or an onshore cellular tower using a wireless telecommunication channel.

16. The method of claim 15, further comprising recognizing and authenticating incoming watercraft using the at least one master node.

17. The method of claim 15, further comprising receiving and queuing one or more requests from other wireless devices and vehicles in an area around the remote structure, using the master node.

18. The method of claim 15, further comprising:
   detecting threats from unknown systems using the two or more nodes; and
   reporting the threats to a monitoring station coupled with the satellite or onshore cellular tower using the master node.

19. The method of claim 15, further comprising receiving data from sensors comprised on the offshore structure using the master node, the one or more nodes, or both the master node and the one or more nodes.

20. The method of claim 15, further comprising encrypting the data using the one or more nodes and the at least one master node.

* * * * *